3,361,774
1-METHYL-Δ¹-5α ANDROSTENE INCLUDING ESTERS AND PROCESS OF MAKING THE SAME
Josef Hader, Friedmund Neumann, and Rudolf Wiechert, Berlin, Germany, assignors to Schering Aktiengesellschaft, Berlin, Germany
No Drawing. Filed June 14, 1965, Ser. No. 463,852
Claims priority, application Germany, July 22, 1964, Sch 35,569
4 Claims. (Cl. 260—397.4)

ABSTRACT OF THE DISCLOSURE 1-methyl-Δ¹-5α-androstene-17β-ol-3-one 17-esters of the general formula

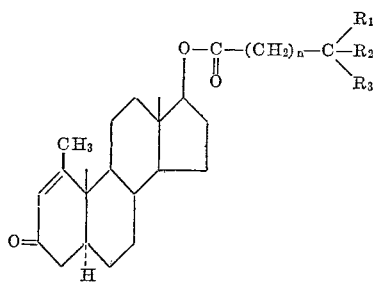

wherein $R_1$ is chlorine and $R_2$ and $R_3$ are members selected from the group consisting of hydrogen and chlorine and wherein $n$ is 0 or 1.

---

1-methyl-Δ¹-5α-androstene 17β-ol - 3 - one is known. Likewise known are the 17-acetate and 17-propionate derivative of this compound. All of these compounds are useful as anabolics.

Surprisingly it was now found that the anabolic effect of the just mentioned compounds can be substantially increased by substituting the alkyl group of the ester residue and particularly of the acetate residue by halogen and preferably chlorine. The thus formed compounds of the invention have been tested in the conventional tests for anabolic and androgenic action using castrated male rats and administering them by subcutaneous application. Surprisingly there resulted not only greater weight increase of the levator ani, but the weight increase of the seminal vesicle was distinctly lower than in the case of the earlier mentioned known compounds. Thus the compounds of the invention provide opportunity for an unusually favorable differentiation of the ratio of activity (Q) between anabolic action and androgenic side effect. This favorable ratio was entirely unpredictable. It is more specifically illustrated by the following table which compares 17-dichloracetate of the invention with the 17-acetate of the prior art:

| Substance | Dose, mg./Animal | Levator ani (mg.) | Seminal Vesicle (mg.) | Anabolic/Q=androgenic |
|---|---|---|---|---|
| 1-methyl-Δ¹-5α-androstene-17β-ol-3-one-dichloracetate | 0.3 | 50 | 71 | 0.704 |
| | 0.1 | 45 | 23 | 1.958 |
| | 0.03 | 28 | 12 | 2.335 |
| 1-methyl-Δ¹-5α-androstene-17β-ol-3-one-acetate | 0.3 | 50 | 121 | 0.414 |
| | 0.1 | 31 | 36 | 0.862 |
| | 0.03 | 19 | 15 | 1.268 |

The compounds of the invention may conveniently be made by esterifying the unsubstituted 17-alcohol with the desired halogenated fatty acid or a reactive derivative thereof. The esterification may be carried out in any of the ways common in steriod chemistry as, for instance, by reacting the alcohol with the corresponding acid chloride or acid anhydride while using pyridine as a solvent or by reacting the alcohol with the unsubstituted acid in the presence of trifluoroaceticacidanhydride.

The principal utility of the esters of the invention is in the manufacture of anabolically active and in particular subcutaneously applicable medicaments.

The following examples shall illustrate the invention without being intended to limit the scope thereof.

Example 1

1.15 ml. dichloroacetylchloride were added to 3.024 g. of 1-methyl-Δ¹-5α-androstene-17β-ol-3-one dissolved in 70 ml. pyridine. The addition was made by dropping the acetylchloride into the solution upon stirring and under a nitrogen atmosphere at a temperature of 0° C. The reaction mixture was left overnight at the same temperature of 0°. Ice water was then stirred into the mixture followed by acidification with dilute hydrochloric acid and extraction with methylenechloride. The methylenechloride phase was washed out with dilute hydrochloride acid and thereafter with water, was dried over $Na_2SO_4$ and concentrated in vacuo by evaporation. The thus obtained crude reaction product was subjected to chromatography with 200 g. $SiO_2+10+H_2O$. By elution with a $CCl_4CH_2Cl_2$ mixture and combining of the different fractions one obtained 2.63 g. 1-methyl-Δ¹-5α-androstene-17β-ol-3-one-17-dichloracetate. This product after recrystallization from isopropylether had a melting point between 149 and 150 C.; UV: $\epsilon_{240}=13300$.

Example 2

302 mg. of 1-methyl-Δ¹-5α-androstene-17β-ol - 3 - one were heated together with 3 ml. dichloroacetic acid and 0.8 ml. trifluoraceticacidanhydride in an argon atmosphere for 20 minutes in a steam bath. The reaction mixture was then permitted to cool, ice water was added and extraction effected with methylenechloride. The methylenechloride phase was washed out with a dilute $NaHCO_3$ solution and then with water and after drying was concentrated in vacuo over $Na_2SO_4$. The residue was subjected to recrystallization from isopropylether. There were obtained 250 mg. 1-methyl-Δ¹-5α-androstene-17β-ol-3-one-17-dichloracetate, melting point 148 to 150° C.

Example 3

5 g. of 1-methyl-Δ¹-5α-anstrostene-17β-ol-3-one were dissolved in 25 ml. pyridine and were reacted dropwise at a temperature between 0 and 5° C. upon stirring during a period of 20 minutes with a solution of 3.11 g. monochloraceticacidanhydride in 30 ml. abs. ether. Stirring was continued for four hours during which time the temperature of the reaction mixture slowly rose. Excess chloraceticanhydride was decomposed with 1 ml. water. The solution was drop added during one hour to 500 ml. water. The precipitated 1-methyl-Δ¹-5α-androstene-17β-ol-3-one-17-chloracetate was filtered off, then successively washed with 5% HCl, 2% sodium bicarbonate solution and water and was dried in vacuo at 50° C. The yield was 5.9 g. and the melting point 102 to 104° C.; UV: $\epsilon_{241}=13380$.

Example 4

500 mg. of 1-methyl-Δ¹-5α-androstene-17β-ol - 3 - one were dissolved in 5 ml. trichloracetic acid and 1 ml. trifluoraceticacidanhydride and were subjected to heating for 30 minutes over a steam bath under a nitrogen atmosphere. The mixture was permitted to cool, ice water was added and extraction was effected with methyleneachloride. The methylenechloride phase was washed with dilute $NaHCO_3$ solution and water. After drying over $Na_2SO_4$ and concentration in vacuo, recrystallization of the cooled product was effected with isopropylether. There were obtained 1-methyl-$\Delta^1$-5α-androstene-17β-ol-3-one-17-trichloracetate melting point 134 to 135° C.; UV: $\epsilon_{241}=13800$.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An androstene compound consisting of a member selected from the group consisting of

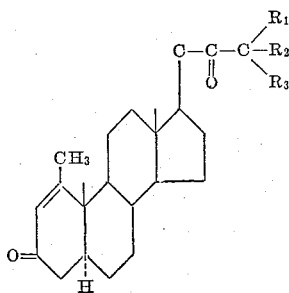

and

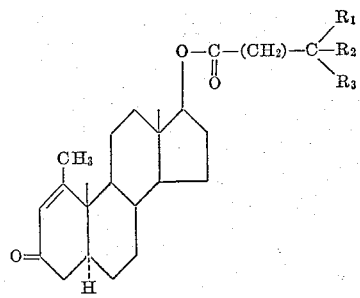

wherein $R_1$ is chlorine and $R_2$ and $R_3$ are members selected from the group consisting of hydrogen and chlorine.

2. 1-methyl-$\Delta^1$-5α-androstene - 17β - ol - 3 - one-17-monochloracetate.

3. 1-methyl-$\Delta^1$-5α-androstene-17β-ol - 3 - one-17-dichloracetate.

4. 1-methyl-$\Delta^1$-5α-androstene-17β-ol - 3 - one-17-trichloracetate.

References Cited
UNITED STATES PATENTS

| | | | |
|---|---|---|---|
| 3,236,867 | 2/1966 | Ringold et al. | 260—397.4 |
| 3,249,628 | 5/1966 | Wiechert | 260—397.4 |
| 3,258,473 | 6/1966 | Kincl | 260—397.4 |

LEWIS GOTTS, *Primary Examiner.*

J. R. BROWN, *Assistant Examiner.*

UNITED STATES PATENT OFFICE
CERTIFICATE OF CORRECTION

Patent No. 3,361,774 January 2, 1968

Josef Hader et al.

It is certified that error appears in the above identified patent and that said Letters Patent are hereby corrected as shown below:

Column 3, lines 20 to 31, for that portion of the formula reading 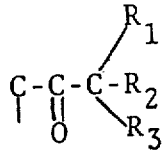 read 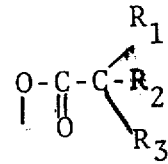

Signed and sealed this 22nd day of July 1969.

(SEAL)
Attest:

Edward M. Fletcher, Jr.
Attesting Officer

WILLIAM E. SCHUYLER, JR.
Commissioner of Patents